United States Patent [19]

Parker et al.

[11] Patent Number: 5,613,706

[45] Date of Patent: Mar. 25, 1997

[54] SELF-CONTAINED INFLATOR PYROTECHNIC INITIATOR

[75] Inventors: Todd S. Parker, Bountiful; Gregory J. Lang, South Ogden, both of Utah

[73] Assignee: Morton International, Inc.

[21] Appl. No.: 572,206

[22] Filed: Dec. 13, 1995

[51] Int. Cl.[6] ................................................ B60R 21/26
[52] U.S. Cl. .......................... 280/741; 280/736; 222/3; 102/202
[58] Field of Search ........................... 280/741, 736, 280/731; 222/3; 102/530, 202, 202.14; 422/164, 165

[56] References Cited

U.S. PATENT DOCUMENTS

| | | | |
|---|---|---|---|
| 4,203,787 | 5/1980 | Kirchoff et al. | 149/35 |
| 4,296,084 | 10/1981 | Adams et al. | 422/166 |
| 4,369,079 | 1/1983 | Shaw | 149/45 |
| 4,530,516 | 7/1985 | Adams et al. | 280/741 |
| 5,346,254 | 9/1994 | Esterberg | 280/741 |
| 5,387,007 | 2/1995 | Ogawa et al. | 280/736 X |
| 5,398,967 | 3/1995 | Carothers et al. | 280/741 |
| 5,419,578 | 5/1995 | Storey et al. | 280/741 |
| 5,458,371 | 10/1995 | Fulmer et al. | 280/741 |
| 5,482,316 | 1/1996 | Lang et al. | 280/741 |

*Primary Examiner*—Christopher P. Ellis
*Attorney, Agent, or Firm*—Gerald K. White

[57] ABSTRACT

Featured in an air bag inflator in respect of which, during assembly, there is a requirement for the ignition train to be installed last, along with a need to hermetically seal both the gas generant material and the ignition train from the environment, is the use of two independent pressure vessels, one of which contains the gas generant material, filtering and cooling elements and a separate pressure vessel having an open end into which is inserted a squib capable of being activated by an appropriate signal and which contains all of the primary and secondary ignition pyrotechnics, the open end of the pressure vessel being closed by the presence of the squib, the pressure vessel having a necked region in its length which forms a plenum chamber when mated to the second pressure vessel containing the gas generant material, etc., the circumferance of the pressure vessel containing the squib being ported in such a way as to allow the squib, when fired, to shear out, the effluent of the squib being transferred out through the breaches created at the ported locations into the plenum, the effluent in the plenum then breaching similar ports incorporated into the second pressure vessel containing the gas generant material, the effluent then dispersing into the cavity of the second pressure vessel igniting the gas generant material.

20 Claims, 2 Drawing Sheets

PRIOR ART 5,613,706

SELF-CONTAINED INFLATOR PYROTECHNIC INITIATOR

BACKGROUND OF THE INVENTION

1. Field of the Invention

This invention relates to low cost steel gas generator or inflator assemblies that utilize the combustion of a solid fuel gas generant composition for the generation of a gas for rapidly inflating vehicle passive restraint inflatable crash protection bags, and more particularly, to a device comprising an improved ignition train for such low cost steel inflator assemblies, but having application to any inflator the construction of which is modifiable to allow for the utilization of such a device.

2. Description of the Related Art

Inflators for the inflation of inflatable crash protection or "air bag" restraint systems must be constructed to withstand the mechanical and thermal stresses that are generated by such systems. This has led to the use for lighter weight systems of aluminum instead of steel in constructing the inflator housing and other structural components. A form of light weight inflator that utilizes aluminum for the housing structure is disclosed in U.S. Pat. No. 5,419,578 that was granted to Kirk Storey, Michael P. Jordan and Brent Olsen and to the assignee of the present invention.

The aluminum housing constructions of such prior art inflators include first and second structural components, a diffuser and a base. The diffuser and base are welded together in a single inertia welding operation to form igniter, combustion and filtering chambers, the assembly being welded in a wholly loaded condition.

Some of the internal components of the inflators known in the prior art are capable of being adversely influenced by environmental factors. As a result, a problem is encountered when the welds used to secure the diffuser and base components together are not airtight or hermetic, that is, the welds allow air to escape or enter the inflator.

In the aforementioned U.S. patent there is disclosed a welded inflator housing construction comprising diffuser and base components made from different aluminum alloy materials. These different aluminum alloy materials provide an inflator housing construction having an improved hermetic seal, i.e., improved leak rate performance. A disadvantage of this construction is that it is expensive to manufacture.

In all of the embodiments of an inflator having a low cost steel housing construction, there is a requirement for the ignition train to be installed last. Along with this requirement is the need to seal the gas generant composition, and the ignition train, also, from the environment. This is because, similarly to inflator housing constructions made from aluminum, exposure to the environment has been shown to degrade or prevent the proper operation of the inflator. It is very difficult to combine these requirements as the processes needed involve the use of high energies to seal or close the ignition train into the main body, that is the gas generating combustion chamber, of the inflator. These energies potentially can ignite the inflator during construction.

Other alternative embodiments involve elaborate seals or fastening mechanisms which would be difficult to assemble and relatively expensive to manufacture.

Thus, there is a need for further improvement in the structure of inflators having a low cost steel housing construction to overcome this problem involving the requirement regarding installation last of the ignition train and hermetic sealing. It is to a practicable, low cost solution of this problem that the present invention is directed.

SUMMARY OF THE INVENTION

An object of the invention is to provide an inflator with an independent ignition train.

Another object of the invention is to separate the requirements for the ignition train to be installed last and for hermetic sealing in such a way as to make them independent of each other.

Still another object of the invention is to provide a self-contained pyrotechnic initiator.

A further object of the invention is to provide a self-contained pyrotechnic ignition train that has application to any driver inflator or any inflator which can be designed to allow for the insertion therein of such a device.

Another object of the invention is to provide for use with an inflator pressure vessel containing the gas generating material, filter and cooling elements, another pressure vessel or device which is independent of the inflator pressure vessel and contains the primary and secondary ignition pyrotechnics, with the separation of the pressure vessels allowing for simplification of assembly, including installation last of the primary and secondary ignition pyrotechnics, and sealing processes which are essential to extending the life of the inflator.

In accomplishing these and other objectives of the invention, the device consists of a pressure vessel into an open end of which is inserted a squib that is capable of being activated by an appropriate signal. The device contains all of the primary and secondary ignition pyrotechnics. The open end of the pressure vessel of the device is closed by the presence of the squib which fits closely with the pressure vessel walls. The pressure vessel of the device has a necked region in its length which forms a plenum region when mated to the second pressure vessel containing the gas generating materials, etc. The circumference of the pressure vessel of the device is ported in such a way as to allow the walls of the squib to shear or swell out when the squib is fired. The effluent of the squib is transferred out through the breaches created at the ported locations and into the plenum region. The porting is arranged so as to reduce the possibility of creating thrust by the jetting effluent. The effluent in the plenum region then breaches similar ports incorporated into the pressure vessel that contains gas generating material and other elements. The effluent then disperses into the latter pressure vessel and ignites the gas generating materials. The two pressure vessels are closely fitted so as to discourage effluent from exiting at their interface surface. Small amounts of effluent or gas may pass through the interface without adversely affecting the performance of the inflator.

Inasmuch as the two pressure vessels are independent of each other, it is desirable that the igniter pressure vessel should be thrust neutral, having a net thrust of zero. If the igniter pressure vessel is not thrust neutral, it will tend to eject itself from the center of the secondary pressure vessel. A nonthrust neutral igniter vessel would require implementation of devices to retain the vessel during operation.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

Having summarized the invention, a detailed description of the invention follows with reference being made to the accompanying drawings which form part of the specification, of which.

DESCRIPTION OF A TYPICAL PRIOR ART GAS GENERATOR OR INFLATOR ASSEMBLY

Figure 1:
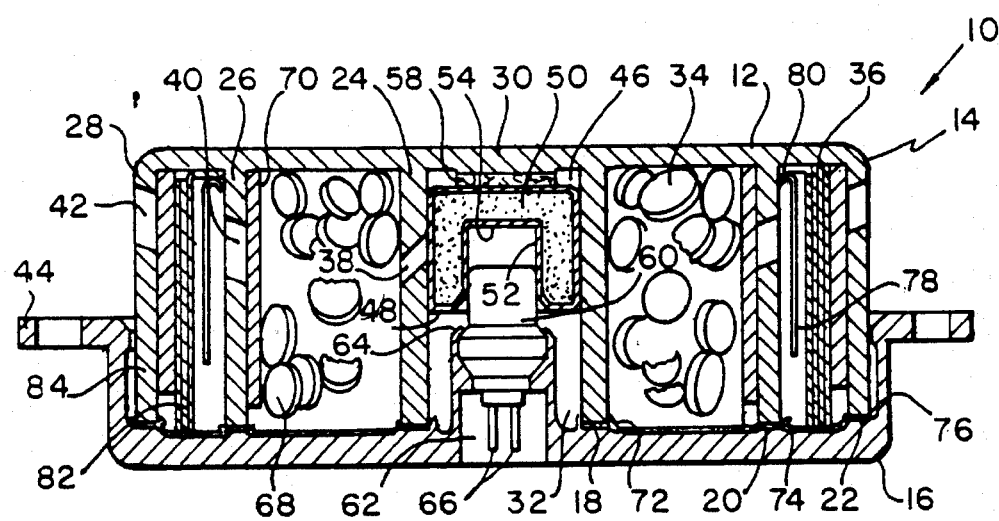
FIG. 1 is a diametrical cross-sectional view of a typical prior art air bag gas generator or inflator assembly.

While not shown in FIG. 1, the prior art gas generator or inflator assembly 10 has a generally cylindrical external outline. The assembly 10 includes a housing construction 12 comprising two structural components. The two structural components comprise an upper shell or diffuser 14 and a lower shell or base 16 which are joined by three concentric inertia welds shown at 18, 20 and 22 to form the housing construction 12. The three inertia welds are performed simultaneously in a single welding operation.

The diffuser 14 is formed by forging three concentric cylinders 24, 26 and 28, each of which cylinders extend downwardly from a common flat upper wall 30 of the diffuser 14 to form a separate weld interface with the base 16. The inner cylinder 24 in cooperation with the wall 30 of the diffuser 14 and the base 16 forms a central inner chamber, specifically an igniter chamber 32. The intermediate cylinder 26, in cooperation with the inner cylinder 24, wall 30 and base 16 forms an inner chamber having the shape of a toroid that comprises a combustion chamber 34. The outer cylinder 28, in cooperation with the inner cylinder 26, wall 30 and base 16, forms an outer chamber that also has the shape of a toroid and comprises a filtering chamber 36. Cylinders 24, 26 and 28 each include a plurality of uniformly spaced openings or ports 38, 40 and 42, respectively, through which the generated or inflation gas flows into a protective air bag (not shown) to be filled. The base 16 includes an interface attachment flange 44 which is used to attach the inflator assembly 10 to a vehicle the occupants of which are to be protected.

Positioned within the igniter chamber 32 is an igniter charge assembly 46 comprising a rupturable closed container 48 containing pyrotechnic igniting material 50. Container 46, which may be hermetically sealed against moisture, has a recess or cavity 52 formed in the bottom 54 thereof and is retained in the chamber 32 by a retaining ring 56. Retaining ring 56 has a shape conforming to the bottom 54 of container 46 including the cavity 52 and may be inserted in chamber 32 in press fit relation therewith. At the top end thereof, container 46 is held in spaced relation with the inner surface of wall 30 by cushion spacer material 58 which may comprise a ceramic fiber material Although various pyrotechnic materials may be employed for igniter material 50, a preferred material is a granular mixture of 25% by weight of boron and 75% of potassium nitrate. This mixture has been found to burn with a very hot flame that is suitable for igniting the solid fuel gas generant material employed in the inflator assembly 10.

Extending into the cavity 52 of the container 46 is an initiator or squib 60. Squib 60 has a conically shaped lower portion and is mounted in a hole 62 having a mating conically shaped upper portion, the hole 62 being provided at a central location in base 16. Squib 60 is retained in hole 62 by a crimp 64 that is formed in base 16 at the upper end of hole 62 and which overlaps and engages the conically shaped upper portion of squib 60. Squib 60 typically is a conventional electric squib having a pair of energizing electrical terminals 66 that are adapted for plug-in connection to external crash sensor means (not shown).

Contained within the toroidal combustion chamber 34 are uniformly distributed pellets 68 of a gas generant composition which may be any one of a number of compositions meeting the requirements of burning rate, nontoxicity and flame temperature. One composition may be that described in U.S. Pat. No. 4,203,787 granted to Fred E. Schneiter and George F. Kirchoff, which patent is assigned to the assignee of the present invention. Another composition that may be advantageously utilized is that described in U.S. Pat. No. 4,369,079 granted to Graham C. Shaw, which patent also is assigned to the assignee of the present invention.

Pellets 68 are surrounded by an annular inner screen pack or combustion chamber filter 70.

It is noted that during the formation of the inertia welds 18, 20 and 22 which is performed with the inflator assembly 10 in a wholly loaded condition, flashing indicated respectively at 72, 74 and 76 is formed around the ends of the concentric cylinders 24, 26 and 28.

In the outer chamber 36, a deflector ring 78 is provided. Deflector ring 78 is formed with an inwardly directed curved flange 80 at its upper end. Also included in the toroidal chamber 36 is an outer screen pack or filter 82. Screen pack 82 may desirably include a coarse layer 84 adjacent the inner surface of the outer cylinder 28.

The housing construction 12 provides a structure for containing the high pressure inflation gases which are produced by combustion of the gas generant pellets 68. Functioning of the inflator assembly 10 begins with an electric signal from a crash sensor (not shown) to the squib 60. The squib 60 fires into and pierces the rupturable container 48 and hot igniter gas flows through the exit openings 38 in the inner cylinder 24 and into the toroidal combustion chamber 34. The hot igniter gases ignite the gas generant pellets 68 which releases the nitrogen inflator gases. These gases flow through the inner screen filter pack 70 and radially outward through the combustion chamber exit openings 40. The screen filter pack 70 serves to cool the inflator gases and to remove particulate residue therefrom. As the gases exit the combustion chamber exit openings 40, they are turned downward by deflector ring 78 where they strike flashing 74 from the intermediate cylinder inertia weld 20. The flashing 74 serves to interrupt the gas flow which helps to further remove particulate matter from the inflation gas flow. The inflation gases then flow up into the filter screen pack 82 and coarse layer 84, and finally radially outward through the exit openings or port holes 42. The screen pack 82 and coarse layer 84 serve to further cool the exhaust gases and remove particulate matter.

As those skilled in the art will recognize, the prior art inflator 10 is characterized in that the squib 60 and charge assembly 46 comprise a primary and secondary igniter system that is integral with the inflator. This is because the inflator 10 consists of a single pressure vessel with multiple chambers. These chambers comprise the ignition chamber 32, the combustion chamber 34, and the filtering chamber 36, which chambers hold, respectively, the primary and secondary ignition systems, the gas generating materials, and filtering and cooling elements.

DETAILED DESCRIPTION OF A PREFERRED EMBODIMENT OF THE PRESENT INVENTION

Figure 2:
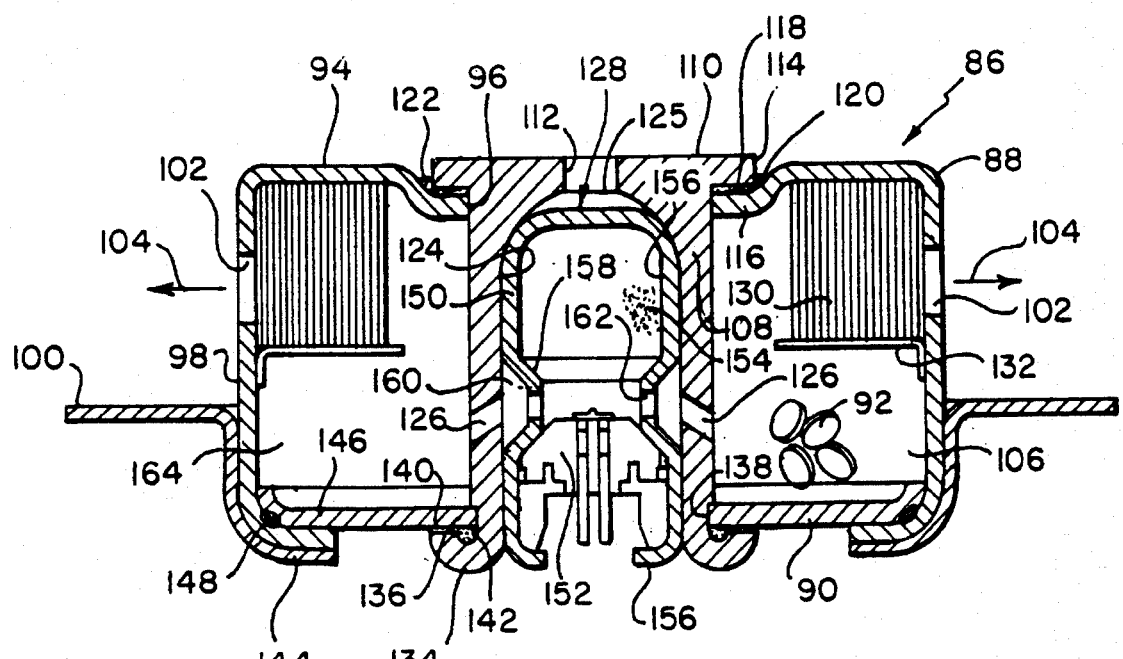
FIG. 2 is a diametrical cross-sectional view of a new and improved air bag gas generator or inflator and housing constructed in accordance with the features of the present invention.

There is illustrated in FIG. 2 a new and improved gas generator or inflator for inflating an air bag that is constructed in accordance with the features of the present invention. This inflator is referred to generally by the reference numeral 86. The inflator 86 includes a housing or container formed of sheet metal such as steel having an upper, inverted, annular, cup-shaped, diffuser cover 88 and a generally circular annular base 90 that are joined to form a chamber or enclosure for a pressure vessel containing a quantity of solid, gas generant material 92 in the form of pellets that may be of the same composition as the pellets 68 in FIG. 1, or if desired, the gas generant 92 may be in the form of wafers. The gas generant material 92 is adapted to rapidly combust to provide a necessary volume of inflation gas for deployment of an air bag in gas flow communication with the inflator 86.

The diffuser cover 88 includes a generally circular top wall 94 having a generally central aperture 96 therein. An integral, downwardly depending, cylindrical outer side wall 98 joins the outer peripheral edge of the top wall 94. A radially outwardly extending mounting flange 100 is secured to the outer side wall 98 for mounting the inflator 86 in a steering wheel hub assembly (not shown) of an automotive vehicle.

The cylindrical outer side wall 98 and the circular top wall 94 may be formed of sheet steel in a spin forming or deep draw operation. The outer side wall 98 is provided with a plurality of gas discharge ports 102 for directing gas generated in the housing 88 outwardly into an air bag (not shown) as indicated by the radially extending arrows 104.

The inflator 86 includes a cylindrical combustion and filter containing chamber 106 that is defined by the diffuser cover 88, the circular annular base 90, and by the inner cylindrical side wall of a forged cylindrical member 108 that is shaped like a rivet. Member 108 has a circular top wall 110 having a centrally positioned vent hole 112 therein. An outer edge portion 114 on the top wall 110 of member 108 faces a depressed circular edge portion 116 on the upper surface of the central aperture 96 of the top wall 94. Placed between the edge portions 114 and 116 to provide an airtight hermetic seal is an annular sealing gasket 118.

In lieu of a sealing gasket 118, and for additional strength, the outer edge 114 of the top wall 110 may be welded to the depressed circular edge portion 116 of the top wall 94 with an annular weld 120 forming a hermetic seal. Alternatively, an annular weld 122 such as a laser weld or a shot weld may be provided between the edge portions 114 and 116 to provide a hermetic seal in lieu of the gasket 118.

The forged member 108 includes an integral inner side wall 124 in coaxial alignment with the cylindrical outer side wall 98 that extends downwardly from the underside of the top wall 110. Within the rivet-like forged member 108 is a space 125 in which a pressure vessel device generally indicated at 128 is positioned. The inner side wall 124 is formed with a plurality of normally sealed ports 126 that when breached provide communication between the pressure vessel device 128 and the surrounding annular combustion and filter chamber 106.

The gas generant material 92 is arranged in an annular mass over the entire bottom half of the chamber 106 and over a substantial portion of the upper half thereof that is nearest to the inner side wall 124. An annular filter 130 is positioned in the upper half of chamber 106, that half which is furthest from the inner side wall 124. A variety of different types of annular filters 130 may be utilized. In general, the filter 130 includes a large area, cylindrically shaped, inner face for receiving hot combustion products generated in chamber 106 and an outer surface in facing confrontation with the diffuser gas discharge ports 102. The diffuser ports 102 are sealed off against the entry of outside contaminating elements during the life of the inflator 86 before activation by means of an adhesive aluminum foil sealing tape (not shown) which is readily ruptured by gas pressure when activation of the inflator 86 to fill an associated air bag takes place.

A resilient, annular, sealing ring gasket 132 that is suitably attached in a sealing manner at its outer periphery to the inner surface of the cylindrical outer side wall 98 of the diffuser cover 88 is provided in order to prevent blow-by of the hot gases around the lower ends of the annular filter 130. The sealing ring gasket 132 ensures good filtering action by containing the gas flow within the available flow cross-section of the filter 130 until reaching the diffuser wall ports 102.

A lower end portion 134 of the cylindrical inner side wall 124 is crimp formed over against an adjacent inner edge portion 136 around a central opening 138 in the annular circular base 90. The central openings 96 and 138 in the respective top wall 94 and base 90 are in coaxial alignment and equal in diameter to accommodate the inner wall 124 of the forged member 108 which extends through the openings. A sealing gasket 140 may be provided between the crimped over lower end portion 134 of the inner side wall 124 and the inner edge portion 136 of the wall of the base 90 around the central opening 138.

In lieu of the sealing gasket 140, an annular weld 142 which may be like the welds 120 and 122 may be utilized to provide a hermetic seal between the edge portions 134 and 136. During assembly of the inflator 86, the joint between the edge portions 134 and 136 is established in a crimp forming operation.

In accordance with an important feature of the present invention, a lower end portion 144 of the outer cylindrical side wall 98 is crimped over to establish a crimp formed joint against an outer peripheral edge portion 146 of the circular annular base 90 to complete the sealing or closing of the housing or container 88 after all of the internal components in the cylindrical combustion and filter chamber 106 have been inserted. In order to provide a hermetic seal between the end portions 144 and 146, an annular weld 148 may be utilized. Weld 148 may be like the welds 120 and 122 that have previously been described herein.

Figure 4:
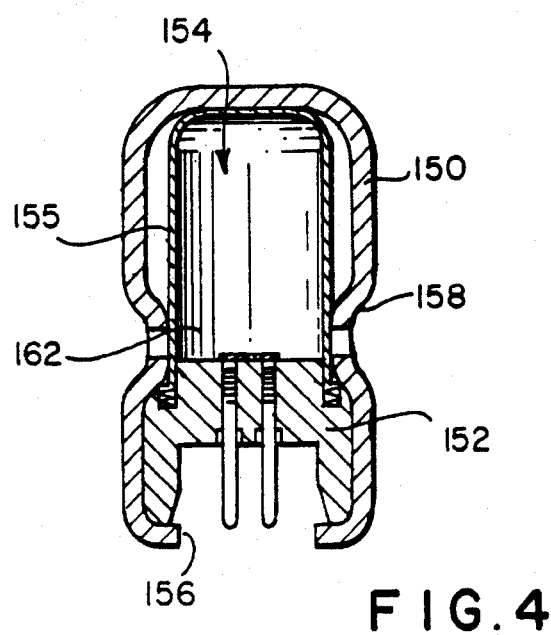
FIG. 4 is a more detailed diametrical cross-sectional view of the igniter train, comprising an ignition pressure vessel device.

In accordance with the present invention, the ignition pressure vessel device 128 of the inflator 86 contains all of the primary and secondary ignition pyrotechnics that are required by the inflator. The device 128 consists of a pressure vessel container 150 that is capable of withstanding a pressure of at least 6000 pounds per square inch (PSI) into which container 150 is inserted a squib 152 that is activated by an appropriate signal that is indicative of the onset of a vehicular collision. The squib 152 contains all of the primary and secondary pyrotechnics required by the inflator 86. Specifically, contained within the container 150 is a pyrotechnic charge 154 of a BORON POTASSIUM NITRATE (BKNO₃) and AZIDE mixture. As shown in FIG. 4, the pyrotechnic charge 154 is contained within a suitable protective enclosure 155 that is provided in the pressure vessel container 150. The open end 156 of the pressure vessel container 150 is closed by the presence of the squib 152 which fits closely with the walls of the pressure vessel container 150.

The pressure vessel container 150 has a necked region 158 in its length which forms a plenum region 160 when mated to the pressure vessel that contains the gas generating material 92, etc. The container 150 is press fit in the igniter rivet 108. The circumference of the pressure vessel container 150 is ported by normally sealed ports 162 in such a way as to allow the walls thereof to shear out when the squib 152 is fired. The effluent of the pressure vessel container 150 is transferred out through the breaches created at the ported locations and into the plenum region 160. The porting is arranged so as to reduce the possibility of creating thrust from the jetting effluent. The effluent in the plenum region 160 then breaches similar ports 126 incorporated in the igniter rivet 108 and then disperses into the pressure vessel that contains the gas generating material 92, which, for convenience, is designated pressure vessel 164 herein. The two pressure vessels 128 and 164 are closely fitted so as to prevent effluent from exiting at the interface surface. It is noted, however, that small amounts of effluent or gas may pass through the interface without adversely affecting the performance of the inflator.

The use of forming procedures in crimping over the lower end portion 134 of the inner side wall 124 against the inner edge portion 136 around the central opening 138 in the annular base 90 and the crimping over of a lower end portion 144 against the outer peripheral end portion 146 of the circular base wall 90 facilitates the rapid assembly of the air bag inflator 86. These procedures also allow the use of lower cost sheet material of aluminum or steel to be used instead of a more expensive cast or forged structure. The strong rivet-like forged member 108 provides an assured way of firmly securing central portions of the top wall 94 and the base wall 90 against bulging or fracture from gas pressure when the inflator 86 is activated.

In accordance with an important feature of the present invention, the pressure vessel device 128 in cooperation with the rivet-like member 108 provides a way, in respect of low cost steel inflator assemblies, to meet the requirement for the ignition train comprising the primary and secondary ignition system to be installed last. Specifically, when the pressure vessel 64 comprising the combustion and filter chamber 106 has been sealed by crimping the lower end portion 104 of the outer end wall 98 of the diffuser cover 88 against the outer peripheral edge portion 146 of the circular annular base 90, the second pressure vessel device 128 may be inserted within the rivet-like member 108, being press fit therein at locations 166 and 168, as shown in FIG. 3.

Figure 3:
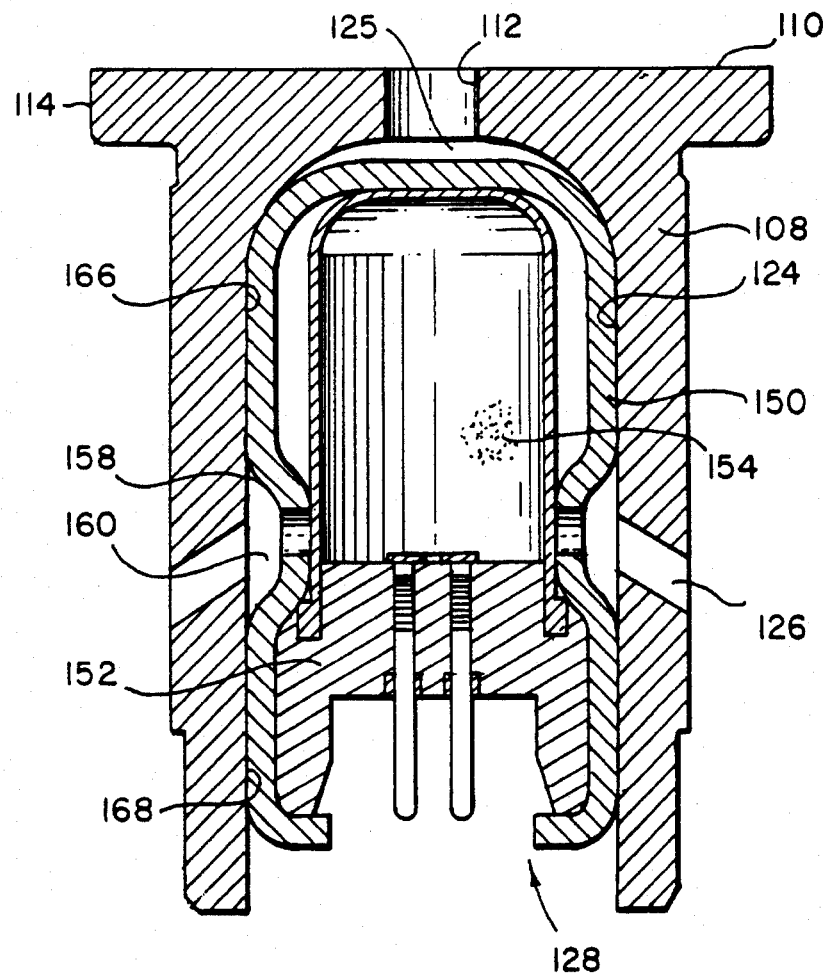
FIG. 3 is a diametrical cross-sectional view of a central portion comprising an igniter rivet and an igniter train before assembly in the inflator of FIG. 2.

Thus, in accord with the invention, the inflator construction shown in FIGS. 2, 3 and 4, and as described herein, separates the requirements for final installation operation and hermetic seal in such a way as to make them independent of each other. There is provided for use with an inflator pressure vessel containing the gas generant material, filter and cooling elements, another pressure vessel, specifically an igniter pressure vessel, which is independent of the pressure vessel containing the gas generant material, and which contains the primary and secondary ignition systems, with the separation of the pressure vessels allowing for simplification of assembly including installation last of the primary and secondary ignition systems, and sealing processes which are essential to extending the life of the inflator.

With this description of the invention in detail, those skilled in the art will appreciate that modifications may be made to the invention without departing from the spirit thereof. Therefore, it is not intended that the scope of the invention be limited to the specific embodiment that has been illustrated and described. Rather, it is intended that the scope of the invention be determined by the scope of the appended claims.

What is claimed is:

1. A housing for an air bag inflator for containing an ignition train and gas generating material, comprising:

a base and a spaced apart coaxial top wall having matching aligned peripheral edges and aligned central openings, an outer side wall extending between said aligned peripheral edges of said base and said top wall and having a plurality of normally sealed gas exit ports, an inner side wall in coaxial alignment with said outer side wall having an upper end in contact with said top wall and a lower end portion crimped over against said lower surface of said base, defining a central inner space in said housing for said ignition train, and having a plurality of normally sealed ignition ports therein, said outer side wall having an annular end flange at a lower end portion crimped over against a lower surface of said base to close said housing, with said base, said top wall, said inner wall and said outer wall defining an annular outer chamber which provides an outer pressure vessel for containing said gas generating material, said ignition train being housed in an inner pressure vessel that is inserted in said central inner space, being press fit against said inner side wall, and having a plurality of normally sealed ignition exit ports therein, said pressure vessel having an open end into which is inserted a squib that closes said open end of said pressure vessel and contains all of the primary and secondary pyrotechnic charge that is required to ignite said gas generating material, said plurality of normally sealed exit ports of said inner pressure vessel being disposed in operative association with said plurality of ignition ports in said inner side wall.

2. A housing for an air bag inflator, as defined in claim 1, wherein said inner pressure vessel has a length and a necked region in said length in which said normally sealed exit ignition ports are disposed, which necked region forms a plenum region in operative association with said inner side wall.

3. A housing for an air bag inflator, as defined in claim 2, wherein said plurality of ports provided in the circumference of said inner pressure vessel allows the walls of said pressure vessel to shear out when said squib is fired.

4. A housing for an air bag inflator, as defined in claim 1, wherein said pyrotechnic charge contained by said squib in said inner pressure vessel comprises a BORON POTASSIUM NITRATE (BKNO₃) and AZIDE mixture.

5. A housing for an air bag inflator, as defined in claim 1, wherein said squib fits closely with the walls of said inner pressure vessel and is capable of being activated by an appropriate signal that is applied externally of said pressure vessel.

6. A housing for an air bag inflator, as defined by claim 1, wherein said central inner space extends between said aligned central openings of said base and said spaced apart coaxial top wall.

7. A housing for an air bag inflator, as defined in claim 1, further including, an annular filter in said annular outer chamber adjacent an inner surface of said outer side wall for entrapping combustion residue from gas generated in said inflator housing before discharge of said gas through said normally sealed gas exit ports.

8. A housing for an air bag inflator, as defined in claim 7, wherein said gas exit ports in said outer side wall are in an upper portion thereof, wherein said annular filter is positioned in a portion of the upper half of said annular outer chamber, and further including an inwardly extending annular sealing ring gasket attached at its outer periphery to the inner surface of said outer side wall and positioned against said filter for preventing gas generated in said housing from bypassing said filter to reach said gas exit ports.

9. A housing for an air bag inflator for containing an ignition train and gas generating material, comprising:

a base and a spaced apart coaxial top wall having matching aligned peripheral edges and aligned central openings, an outer side wall extending between said aligned peripheral edges of said base and said top wall and having a plurality of normally sealed gas exit ports, an inner side wall in coaxial alignment with said outer side wall and having an upper end in contact with said top wall and a lower end portion crimped over against said lower surface of said base defining a central inner space in said housing train, said inner side wall having a plurality of normally sealed ignition exit ports therein, said outer side wall having an annular end flange at a lower end portion crimped over against a lower surface of said base to close said housing with said inner and said outer side walls defining an annular outer chamber in said housing for containing said gas generating material, said ignition train being formed in a device comprising a squib and an inner pressure vessel having an open end into which said squib is inserted, said squib being capable of being activated by an appropriate signal and containing all of the primary and secondary pyrotechnics for said inflator, the open end of said inner pressure vessel being closed by the presence of said squib which fits closely with the walls of the pressure vessel, said device having a necked region in its length which forms a plenum region in operative association with said inner side wall and said exit ports therein when said device is inserted in said inner space, being press fit therein, with the circumference of said device being ported in such a way as to allow the walls of said device to shear out when said squib is fired.

10. A housing for an air bag inflator, comprising:

a quantity of gas generating material, an ignition train, inner and outer side walls and a pair of opposite end walls joined therewith to form a sealed outer pressure vessel having a plurality of normally sealed exit ports therein for said gas generating material, said inner side wall having a plurality of normally sealed ignition exit ports therein and defining a central inner space in said housing for said ignition train, said ignition train being housed in an inner pressure vessel that is inserted in said inner space, being press fit against said inner side wall, and having a plurality of normally sealed ignition exit ports therein disposed in operative association with said ignition exit ports in said inner side wall, said inner pressure vessel having an open end into which is inserted a squib that closes said open end of said inner pressure vessel and contains all of the primary and secondary pyrotechnics for said inflator.

11. A housing for an air bag inflator, as defined in claim 10, wherein said inner pressure vessel has a length and a necked region in said length in which said normally sealed ignition exit ports are disposed, which necked region forms a plenum region in operative association with said inner side wall.

12. A housing for an air bag inflator, as defined in claim 11, wherein the circumference of said inner pressure vessel allows the walls of said pressure vessel to shear out when said squib is fired.

13. A housing for an air bag inflator, as defined in claim 10, wherein said squib fits closely with the walls of said inner pressure vessel.

14. A housing for an air bag inflator, as defined by claim 13, wherein said squib is capable of being activated by an appropriate signal.

15. A housing for an air bag inflator, as defined by claim 10, wherein said base and said spaced apart top wall have aligned central openings, and wherein said central inner space extends between said aligned central openings of said base and said spaced apart top wall.

16. A housing for an air bag inflator, as defined in claim 10, wherein said pyrotechnics contained by said squib comprises a BORON POTASSIUM NITRATE ($BNKO_3$) and AZIDE mixture.

17. A housing for an air bag inflator, as defined by claim 10, further including, an annular filter in said outer pressure vessel adjacent an inner surface of said outer side wall for entrapping combustion residue from gas generated in said housing before discharge thereof through said normally sealed gas exit ports.

18. An air bag inflator including gas generant material and an ignition train and in respect of which there is a requirement for the ignition train to be installed last, along with a need to hermetically seal both the gas generant material and the ignition train from the environment, comprising:

a squib that is capable of being activated by an appropriate signal and which contains all of the primary and secondary ignition pyrotechnics required by said inflator, two independent pressure vessels, one of which contains said gas generant material and a separate pressure vessel having an open end into which is inserted said squib, the open end of said separate pressure vessel being closed by the presence of said squib, said separate pressure vessel having a necked region in its length which forms a plenum chamber when mated to the said one pressure vessel that contains the gas generant material, the circumference of said separate pressure vessel containing said squib being ported in such a way as to allow said squib, when fired, to shear out, the effluent of said squib being transferred out through the breaches created at the ported locations into said plenum chamber, the effluent in said plenum chamber then breaching similar ports incorporated into said one pressure vessel that contains said gas generant material, the effluent then dispersing into said one pressure vessel and igniting said gas generant material.

19. An air bag inflator in respect of which, during assembly, there is a requirement for the ignition train to be installed last, along with a need to hermetically seal both the gas generant material and the ignition train from the environment, comprising:

two independent pressure vessels, one of which contains the gas generant material, filtering and cooling elements and a separate pressure vessel containing a squib that is capable of being activated by an appropriate signal and which contains all of the primary and secondary ignition pyrotechnics required by said inflator, said separate pressure vessel having a length and a necked region in its length which forms a plenum chamber when mated to said one pressure vessel containing the gas generant material, the circumferance of said separate pressure vessel containing said squib being ported in such a way as to allow said squib, when fired, to shear out, the effluent of said squib being transferred out through the breaches created at the ported locations into said plenum chamber, the effluent in the plenum chamber then breaching similar ports incorporated into said one pressure vessel containing the gas generant material, the effluent then dispersing into said one pressure vessel and igniting the gas generant material.

20. An ignition train comprising:

a pressure vessel having an open end into which is inserted a squib capable of being activated by an appropriate signal and containing primary and secondary ignition pyrotechnics, the open end of said pressure vessel being closed by the presence of said squib, said pressure vessel having a length and a necked region in its length which forms a plenum chamber when mated to a second pressure vessel, the circumference of said pressure vessel containing said squib having ported locations arranged in such a way as to allow said squib, when fired, to shear out, the effluent of said squib being transferred out through the breaches created at the ported locations into said plenum chamber, the effluent in the plenum chamber then breaching similar ports incorporated into the second pressure vessel, the effluent then dispersing into the second pressure vessel.

* * * * *